United States Patent Office 3,055,915
Patented Sept. 25, 1962

3,055,915
PROCESS FOR THE PREPARATION OF Δ$^{1,4}$-PREGNADIENE-3,20-DIONE AND INTERMEDIATES THEREFOR
Franz Sondheimer and George Rosenkranz, Mexico City, Mexico, assignors, by mesne assignments, to Syntex Corporation, a corporation of Panama
No Drawing. Filed Jan. 11, 1956, Ser. No. 558,422
Claims priority, application Mexico, Feb. 17, 1955
16 Claims. (Cl. 260—397.3)

The present invention relates to novel cyclopentanophenanthrene derivatives and to a method for the production thereof.

More particularly, the present invention relates to the novel progestational hormone Δ$^{1,4}$-pregnadiene-3,20-dione (1-dehydroprogesterone), to novel intermediates for the production thereof and to a novel process for the production thereof.

Δ$^{1,4}$-pregnadiene-3,20-dione is a novel progestational hormone having progestational properties similar to that of the known hormone progesterone. Δ$^{1,4}$-pregnadiene-3,20-dione is also a novel intermediate for the production of the known compound 3-hydroxy-17-acetyl-1,3,5-estratriene which may be utilized for the manufacture of 19-norprogesterone as set forth in U.S. application Serial No. 250,036, filed October 5, 1951, now U.S. Patent No. 2,759,951. In accordance with the present invention it has been discovered that the novel progestational hormone Δ$^{1,4}$-pregnadiene-3,20-dione may be prepared from the known acetate of allopregnane-20β-ol-3-one disclosed for example by Rubin et al., J.A.C.S. 73, 2340 (1951). Other conventional esters of allopregnane-20β-ol-3-one may be also utilized for the process of the present invention. In accordance with the present invention it has been discovered that allopregnan-20β-ol-3-one may be dibrominated to produce the corresponding esters of 2,4-dibromo-allopregnan-20β-ol-3-one which may be dehydrobrominated to give the novel intermediate esters of Δ$^{1,4}$-pregnadiene-20β-ol-3-one. These last mentioned esters may be conventionally saponified to give the free Δ$^{1,4}$-pregnadiene-20β-ol-3-one which may be oxidized with a suitable oxidizing agent to give the desired Δ$^{1,4}$-pregnadiene-3,20-dione.

It has further been discovered in accordance with the present invention that when the acetate of Δ$^{1,4}$-pregnadiene-20β-ol-3-one is subjected to dienone-phenol rearrangement there is prepared the corresponding diacetate of 4-methyl-Δ$^{1,3,5(10)}$-nor-pregnatriene-1,20-diol and that when Δ$^{1,4}$-pregnadiene-3,20-dione is subjected to the same rearrangement there is prepared the novel diacetate of 4-methyl-Δ$^{1,3,5(10),17(20)}$-nor-pregnatetraene-1,20-diol. Further, in accordance with the present invention pyrolysis of Δ$^{1,4}$-pregnadiene-3,20-dione gives 3-hydroxy-17-acetyl-1,3,5-estratriene.

The following equation exemplifies a portion of the novel process of the present invention:

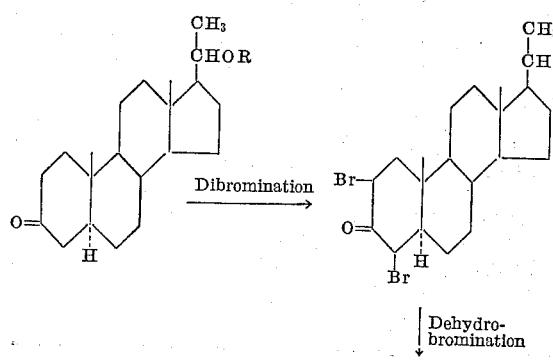

In the above equation R represents preferably a lower fatty acid residue or the residue of benzoic acid. However, R may represent the residue of any acid ordinarily used as for example in the form of its anhydride or acyl chloride for the esterification of steroid alcohols. In general, these acids may be classified as carboxylic acids of less than about 10 carbon atoms and especially hydrocarbon carboxylic acids, including carboxylic acids, such as cyclopentyl propionic, aromatic acids such as benzoic 4-nitrobenzoic, simple aliphatic acids such as acetic, propionic, and butyric acids and dicarboxylic acids such as succinic acids which may form either the mono or di esters. As may be understood, the acid grouping may be substituted, as for example, by nitro groups and/or halogen groups.

The esters of allopregnane-20β-ol-3-one are preferably treated with a slight excess over 2 mols of bromine while in solution or suspension in acetic acid. Preferably, the reaction solution is kept standing for a substantial period of time of the order of four hours after the bromine has been added. The resultant product is the corresponding ester of 2,4-dibromo-allopregnan-20β-ol-3-one. For the second step of the above outlined process the dibromo compound resulting from the first step is treated with a mixture of leutidine and collidine under reflux conditions. The resultant product is the corresponding ester of Δ$^{1,4}$-pregnadiene-20β-ol-3-one.

The ester prepared in accordance with the previous step is then saponified, preferably with an alkali metal hydroxide such as potassium hydroxide in a lower aliphatic alcohol solvent such as methanol to give the free compound Δ$^{1,4}$-pregnadiene-20β-ol-3-one. For the oxidation of the 20-hydroxyl group this compound is treated with an oxidizing agent capable of converting secondary alcohols into ketones as for example chromic acid in solution in pyridine. The oxidation is preferably performed at a temperature below room temperature as for example between 5 and 10° C. The resultant compound is Δ$^{1,4}$-pregnadiene-3,20-dione. Another portion of the process of the present invention is set forth in the following equations:

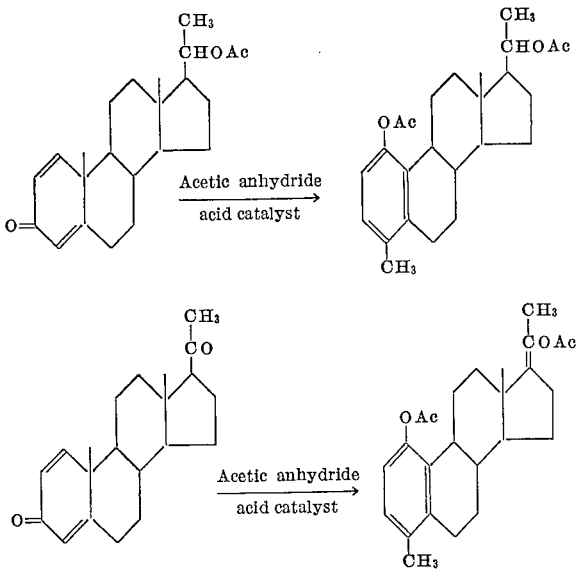

In the above equations Ac represents the acetate group. In practicing the reaction above-set-forth the acetate of $\Delta^{1,4}$-pregnadiene-20β-ol-3-one or $\Delta^{1,4}$-pregnadiene-3,20-dione is dissolved in acetic anhydride and mixed with a catalytic amount of an acid, as for example p-toluenesulfonic acid. The mixture is then heated for a substantial period of time, of the order of four hours, on a steam bath and then poured into water and allowed to hydrolyze. The precipitate is then filtered, washed to give the corresponding diacetate of 4-methyl-$\Delta^{1,3,5}$-nor-pregnatriene-1,20-diol or 4-methyl-$\Delta^{1,3,5(10),17(20)}$-nor-pregnatetraene-1,20-diol.

The following equation serves to illustrate the production of 3-hydroxy-17-acetyl-1,3,5-estratriene from $\Delta^{1,4}$-pregnadiene-3,20-dione:

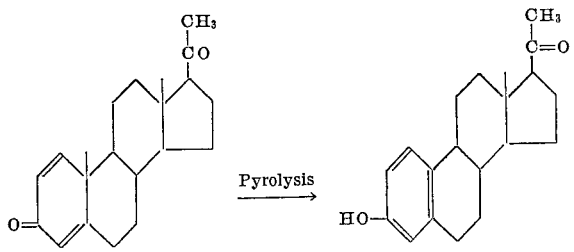

In practicing the process above-outlined, $\Delta^{1,4}$-pregnadiene-3,20-dione is dissolved in mineral oil and then passed through a glass tube packed with glass rings and heated to a temperature of approximately 600° C. The resultant solution is then cooled and the crystals which separated after purification were found to be 3-hydroxy-17-acetyl-1,3,5-estratriene.

The following specific examples serve to illustrate but are not intended to limit the present invention.

*Example I*

A solution of 10 g. of the acetate of allopregnan-20β-ol-3-one in 300 cc. of C.P. acetic acid was treated dropwise and under continuous stirring with 10.08 g. of bromine (2.1 mols) in 100 cc. of acetic acid, at room temperature. The solution was kept standing for 4 hours, poured into water and the precipitate was filtered and washed to neutral. This crude product, namely the acetate of 2,4-dibromo-allopregnan-20β-ol-3-one, had a melting point of 85° to 90° C. and was used without further purification for the reaction described in Example II.

*Example II*

The dibromo compound obtained in accordance with Example I was dissolved in a mixture of 45 cc. of lutidine and 45 cc. of collidine and refluxed for 90 minutes under anhydrous conditions. After cooling, the hydrobromide was filtered and the solution diluted with ether, washed with dilute hydrochloric acid, water and aqueous sodium carbonate solution. The solution was then dried and evaporated under reduced pressure. The product was crystallized several times from acetone-ether and the mother liquors were chromatographed on washed alumina, thus yielding a total of 6.3 g. of the acetate of $\Delta^{1,4}$-pregnadiene-20β-ol-3-one with a melting point of 164°–165° C., [α]$_D$ +90° (chloroform), with an ultraviolet absorption maximum at 244 mμ, log ε 4.22.

3 g. of this compound was dissolved in 100 cc. of methanol and mixed with a solution of 2.5 g. of potassium hydroxide in 2.5 cc. of water. The mixture was refluxed for 2 hours, poured into water and the product was extracted with ether, washed to neutral, dried and evaporated to dryness. Crystallization from chloroform-hexane afforded $\Delta^{1,4}$-pregnadiene-20β-ol-3-one with a melting point of 188°–189° C. [α] +16° (chloroform), with ultraviolet absorption maximum at λ max. 244 mμ, log ε 4.22.

*Example III*

2 g. of $\Delta^{1,4}$-pregnadiene-20β-ol-3-one was dissolved in 40 cc. of pyridine, the solution was cooled to a temperature of between 5 and 10° C. and added to a solution of 2 g. of chromium trioxide in 40 cc. of pyridine, maintaining the temperature all the time below 10° C. The mixture was kept standing at room temperature for 18 hours and then diluted with water and ethyl acetate and filtered through a layer of celite. The filtrate was abundantly washed with water to remove the pyridine, dried over sodium sulfate and evaporated to dryness under reduced pressure. Crystallization from acetone-hexane yielded 1.38 g. of $\Delta^{1,4}$-pregnadiene-3,20-dione with a melting point of 147°–148° C., [α]$_D$ +113° (chloroform), with an ultraviolet absorption maximum at 244 mμ, log ε 4.23.

*Example IV*

200 mg. of the acetate of $\Delta^{1,4}$-pregnadiene-20β-ol-3-one was dissolved in 8 cc. of acetic anhydride and mixed with 60 mg. of p-toluenesulfonic acid. The mixture was heated for four hours on the steam bath, poured into water and left to hydrolyze (20 minutes). The precipitate was filtered and washed to neutral, thus giving 170 mg. of the diacetate of 4-methyl-$\Delta^{1,3,5}$-nor-pregnatriene-1,20-diol with a melting point of 198°–200° C., λ max. 266 mμ, log ε 2.44.

*Example V*

200 mg. of $\Delta^{1,4}$-pregnadiene-3,20-dione was treated by the method described in Example IV, thus yielding 160 mg. of the diacetate of 4-methyl-$\Delta^{1,3,5(10),17(20)}$-nor-pregnatetraene-1,20-diol with a melting point of 205°–208° C., [α]$_D$ +160°, λ max. 266 mμ, log ε 2.53.

*Example VI*

A solution of 500 mg. of $\Delta^{1,4}$-pregnadiene-3,20-dione in 50 cc. of mineral oil was passed at a rate of 2 cc. per second through a glass tube packed with glass rings and heated at 600° C. The solution was cooled overnight in the refrigerator and the crystals which separated were collected and washed with hexane to remove the mineral oil. There was obtained 200 mg. of 3-hydroxy-17-acetyl-1,3,5-estratriene which after one crystallization from acetone-ether had a melting point of 248°–250° C. Direct comparison with a sample prepared according to J. Am. Chem. Soc. 73, 1526 (1951), showed that the melting point, the mixed melting point and the infrared spectra of their acetates were identical.

We claim:
1. A process for the preparation of $\Delta^{1,4}$-pregnadiene-3,20-dione comprising dibrominating a hydrocarbon carboxylic acid ester of less than 10 carbon atoms of allopregnan-20β-ol-3-one to form the corresponding 2,4-dibromo derivative, dehydrobrominating the 2,4-dibromo derivative to form the corresponding ester of $\Delta^{1,4}$-pregnadiene-20β-ol-3-one, hydrolyzing the ester to $\Delta^{1,4}$-pregnadiene-20β-ol-3-one and oxidizing the 20-hydroxy group thereof with chromic acid in pyridine.

2. The process of claim 1 wherein the ester is the acetate, the dibromination is carried out in the presence of acetic acid and the dehydrobromination is carried out by refluxing with collidine.

3. A process for the preparation of $\Delta^{1,4}$-pregnadiene-20β-ol-3-one comprising dibrominating a hydrocarbon carboxylic acid ester of less than 10 carbon atoms of allopregnan - 20β - ol - 3 - one, dehydrobrominating 2,4-dibromo derivative thus produced and hydrolyzing the ester of $\Delta^{1,4}$-pregnadiene-20β-ol-3-one prepared by the dehydrobromination.

4. The process of claim 3 wherein the ester is the acetate, the dibromination is carried out in the presence of acetic acid and the dehydrobromination is carried out by refluxing with collidine.

5. A process for the preparation of the diacetate of 4-methyl-$\Delta^{1,3,5(10)}$-19-nor-pregnatriene-1,20-diol comprising reacting the acetate of $\Delta^{1,4}$-pregnadiene-20β-ol-3-one with acetic anhydride in the presence of an acid catalyst.

6. The process of claim 5 wherein the acid catalyst is p-toluenesulfonic acid.

7. A process for the preparation of the diacetate of 4 - methyl - $\Delta^{1,3,5(10),17(20)}$ - 19 - nor - pregnatetraene-1,20-diol comprising reacting $\Delta^{1,4}$-pregnadiene-3,20-dione with acetic anhydride in the presence of an acid catalyst.

8. The process of claim 7 wherein the acid catalyst is p-toluenesulfonic acid.

9. A process for the preparation of 3-hydroxy-17-acetyl-1,3,5(10)-estratriene comprising heating a solution of $\Delta^{1,4}$-pregnadiene-3,20-dione in mineral oil at a temperature of approximately 600° C.

10. A hydrocarbon carboxylic acid ester of less than 10 carbon atoms of 2,4-dibromo-allopregnane-20β-ol-3-one.

11. The acetate of 2,4-dibromo-allopregnane-20β-ol-3-one.

12. A new compound selected from the group consisting of $\Delta^{1,4}$-pregnadiene-20β-ol-3-one and hydrocarbon carboxylic acid esters of less than 10 carbon atoms thereof.

13. $\Delta^{1,4}$-pregnadiene-20β-ol-3-one.

14. The acetate of $\Delta^{1,4}$-pregnadiene-20β-ol-3-one.

15. The diacetate of 4-methyl-$\Delta^{1,3,5(10)}$-19-nor-pregnatriene-1,20-diol.

16. The diacetate of 4-methyl-$\Delta^{1,3,5(10),17(20)}$-19-nor-pregnatetraene-1,20-diol.

References Cited in the file of this patent
UNITED STATES PATENTS

| | | |
|---|---|---|
| 2,246,889 | Miescher | June 24, 1941 |
| 2,579,479 | Djerassi et al. | Dec. 25, 1951 |
| 2,759,951 | Djerassi et al. | Aug. 21, 1956 |
| 2,837,464 | Nobile | June 3, 1958 |

OTHER REFERENCES

Kaufman et al.: 72 J.A.C.S. 4351 (1950).
G. Rosenkranz and F. Sondheimer, Progress in the Chemistry of Natural Products, Ed. L. Zechmeister, Vienna, Springer Verlag, pp. 274–389, 1953.
Allen et al.: 76 J.A.C.S. 6116–19 (1954).
E. Vischer et al.: Hel. Chim. Acta, No. 3, vol. 38, pp. 835–840 (1955).